United States Patent [19]

Burgess et al.

[11] Patent Number: 4,742,327
[45] Date of Patent: May 3, 1988

[54] KEYLESS ACCESS CONTROL AND SECURITY SYSTEM

[75] Inventors: James P. Burgess, Camarillo; Peter Kaufman, Santa Barbara, both of Calif.

[73] Assignee: Essex-Tec Corporation, Carpinteria, Calif.

[21] Appl. No.: 558,803

[22] Filed: Dec. 7, 1983

[51] Int. Cl.[4] .............................................. B60R 25/00
[52] U.S. Cl. ........................................ 340/63; 340/64; 340/365 A; 340/543; 340/825.32; 307/10 AT; 361/172
[58] Field of Search ........................ 340/825.56, 63, 64, 340/825.32, 825.37, 542, 543, 365 A; 361/172; 307/10 AT

[56] References Cited

U.S. PATENT DOCUMENTS

| | | | |
|---|---|---|---|
| 3,544,804 | 12/1968 | Gaumer | 307/10 AT |
| 3,609,758 | 9/1971 | Buesing | 340/365 A |
| 3,659,154 | 4/1972 | Finn | 340/543 |
| 3,754,213 | 8/1973 | Morroni et al. | 340/825.32 |
| 3,866,168 | 2/1975 | McGuirk, Jr. | 340/63 |
| 4,205,300 | 5/1980 | Ho et al. | 340/543 |
| 4,205,325 | 5/1980 | Haygood et al. | 340/825.56 |
| 4,206,491 | 7/1980 | Ligman | 361/172 |
| 4,232,289 | 11/1980 | Daniel | 340/64 |
| 4,327,353 | 4/1982 | Beard | 361/172 |
| 4,342,024 | 7/1982 | Rossi | 340/64 |
| 4,437,137 | 3/1984 | Mochida | 307/10 AT |
| 4,490,639 | 12/1984 | Echols et al. | 310/319 |

Primary Examiner—John W. Caldwell, Sr.
Assistant Examiner—Tyrone Queen
Attorney, Agent, or Firm—Learman & McCulloch

[57] ABSTRACT

A keyless access control and security system especially adapted for use with an automobile and including a piezoelectric permutation touchpad unit which can be affixed, without requiring bodywork, to the outside of the vehicle's door in the key cylinder aperture. The touchpad is illuminated when touched and is therefore usable in the dark. The person seeking access must enter the correct access code combination on the touchpad to open the door and/or the trunk. The touchpad is connected to a remotely located logic circuit which controls access. The circuit provides for a signal of low intensity, indicating that a correction in the code entered into the touchpad should be made and, after a time delay, an alarm of high intensity, if no correction is made. Upon activation of the alarm, the head lights are flashed, the horn is sounded, or both. In order to enable a parking attendant, repairman, or some other authorized person to have access to the automobile without revealing the access code, the logic circuit can be programmed, by operation of the touchpad, using the proper access code and a further secondary code, arbitrarily selected, to provide access to the automobile in response to the secondary code, which later can be erased.

22 Claims, 5 Drawing Sheets

FIG.5B

KEYLESS ACCESS CONTROL AND SECURITY SYSTEM

FIELD OF THE INVENTION

This invention relates to apparatus for enabling access to a locked area, such as an automobile, without requiring the use of a key, and for initiating an alarm in the event access is attempted by an unauthorized person.

BACKGROUND OF THE INVENTION

Mechanisms for limiting access to and operability of an automobile came into general use shortly after the general acceptance of the automobile. For example, tumbler locks operable by keys have long been used on doors, glove compartments, trunks, and ignitions. The desirability of eliminating the need for keys also has long been recognized. The Gilmore, U.S. Pat. No. 1,251,365; Chrisman et al, U.S. Pat. No. 1,298,177; Carlson, U.S. Pat. No. 1,587,757; Gibbs, U.S. Pat. No. 2,819,770; and Raju, U.S. Pat. No. 2,964,733, disclose previous proposals for keyless locking systems. None of these proposals is really practical for use in an automobile.

Later attempts to solve this problem used electrical combination locks having push buttons. See, for example, the U.S. Pat. No. 3,353,383 to Fish and to Gaumer, U.S. Pat. No. 3,544,804. Push buttons mounted externally on an automobile are large, expensive, sensitive to environmental factors, and subject to wear. Other recent patents on electrical combination locks include the U.S. Pat. No. 3,024,452; to Leonard, Hevenor, U.S. Pat. No. 3,192,448; and Hinrichs, U.S. Pat. No. 3,691,396, all of which fail to solve the limitations of hardwired logic, mechanical elements, and mechanical switches.

More recent U.S. patents, which have considerably advanced the art, are the Haygood et al, U.S. Pat. No. 4,205,325, and to Ligman et al, U.S. Pat. No. 4,206,491. The Haygood patent discloses a permanent preprogrammed code storage memory and a user programmable code storage memory wherein either code may be used to gain entry to the vehicle and to enable other functions, but the Haygood et al apparatus requires a pushbutton system which necessitates custom bodywork for installation. The Ligman et al patent discloses the use of piezoelectric switches applicable to vehicle locking systems but does not suggest the provision of security alarms. Piezoelectric switches are preferable to mechanical switches in that they are not subject to mechanical wear, are vandal resistant, and can be completely sealed from the environment. On the other hand piezoelectric switches are high electrical impedance devices and thus subject to the problems of electrical interference by extraneous noise signals. Conventional piezoelectric switching techniques require the use of shielded cables between the piezoelectric switches and electronic signal processing units or special signal conversion units located adjacent the piezoelectric switches.

It is not new, of course, to equip a vehicle with an alarm system. The prior art contains numerous examples of alarms which may be activated in the event a vehicle is entered or attempted to be started by an unauthorized person. Those systems, however, are believed to be limited to alarms and associated equipment which, although responsive to unauthorized entry and starting attempts, are really independent units which must be preset by an operator, independently of the vehicle's locking mechanism, so as to be conditioned for operation upon the occurrence of a predetermined event, such as tampering with the vehicle's ignition by an unauthorized person.

SUMMARY OF THE INVENTION

Described herein is a keyless lock control and security system that is particularly well adapted for use with an automobile, that is rugged, vandal and environment resistant, fits into a cylinder lock aperture, is insensitive to electrical noise without the use of shielded cables, and requires no custom bodywork for its installation. The security portion of the system is an integral part of the lock control and requires no independent presetting operations by an operator. The system includes means for actuating an alarm and/or disabling the engine starting mechanism, and includes self-contained means for minimizing false alarms.

The keyless lock control or access system uses a piezoelectric touchpad, mounted on the exterior of the area to which unauthorized access is denied. Unique circuitry is used to eliminate the need for shielded cables. The wiring harness may be passed through a tube which fits into the lock cylinder opening in an access door. In the case of a car door, no custom bodywork is required as the lock cylinder opening is a standard feature of all automobiles.

These and further constructional and operational characteristics of the invention will be more evident from the following detailed description when considered with reference to the accompanying drawings.

DETAILED DESCRIPTION

The invention involves the use of a control unit, preferably a piezoelectric touchpad 10 which enables a user to tap out on the touchpad a secret code consisting of a sequence of digits, or letters if desired, in combination with electronic circuitry which is actuated by the signals emitted by the touchpad and which responds differently, depending upon whether or not the signals are in the correct sequence In one preferred embodiment the touchpad is mounted on the door of an automobile, near the location of a power actuated door lock, and if the correct code is tapped into the touchpad, the electronic circuitry controlled by the touchpad will unlock the door, and perform other functions as well.

The touchpad 10 may be of the type disclosed in the patent to Kompanek, U.S. Pat. No. 4,190,785. The details of the touchpad are not part of the instant invention, and it need merely be pointed out that the touchpad selectively generates piezoelectric signals on plural output circuits (five in the described embodiment) depending on which of five discrete portions of the touchpad have been tapped by an operator's fingers.

Figure 1:
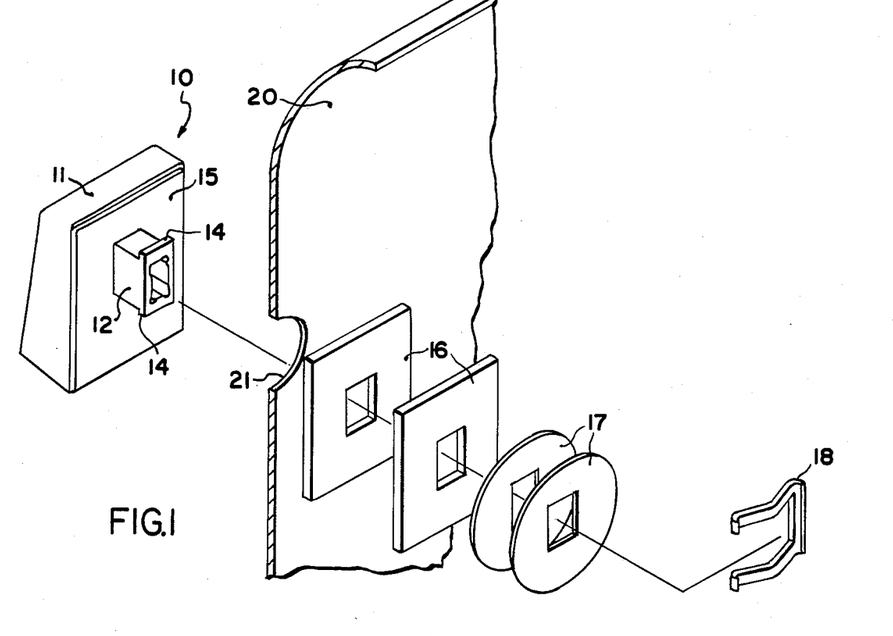
FIG. 1 is an exploded view, as viewed from the interior of an automobile, showing how the rear of a pizeoelectric touchpad assembly is mounted on the lock cylinder aperture of the door.
Figure 3:
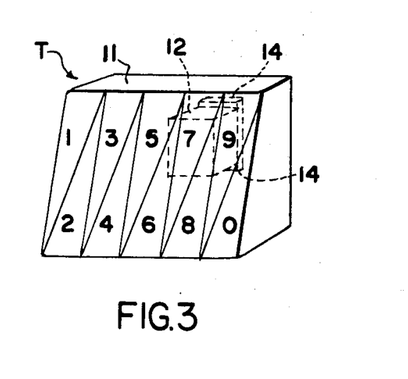
FIG. 3 is an isometric front view of the touchpad.

In FIGS. 1 and 3 the touchpad assembly 10 is shown prior to its being mounted on a door 20 of an automobile, the key cylinder of which has been removed leaving an empty key cylinder aperture 21.

The touchpad has an outer face shown in FIG. 3 divided into five discrete, numbered areas under each of which is a piezoelectric wafer or pad as is illustrated in Ligman et al U.S. Pat. No. 4,206,491.

Different makes and models of automobiles utilize different sizes of key cylinders, and the touchpad assembly 10 is designed so that it will fit into any one of a number of different size key cylinder apertures.

The touchpad assembly 10 has a housing 11 from which projects a tubular extension 12. The extension 12 is provided with two flanges 14 which extend laterally beyond the free end of the extension.

Figure 2:
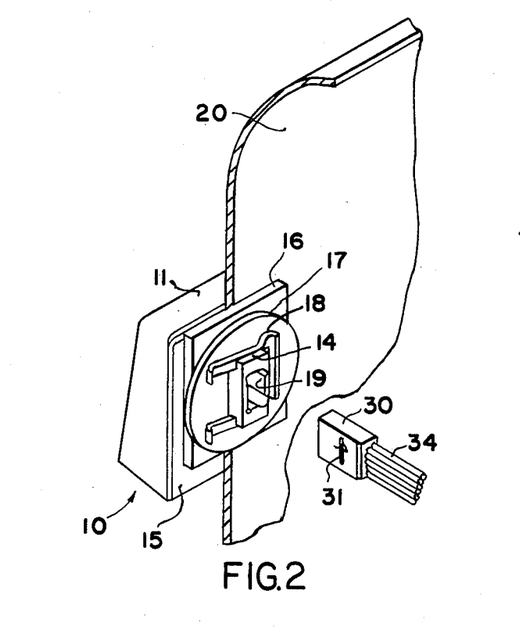
FIG. 2 is a view, corresponding to FIG. 1, with the touchpad assembly mounted on the automobile door.

That side of the touchpad housing 11 which seats against the door 20 is provided with an elastomeric member 15 which provides a weather seal when the housing is affixed to the door. To attach the touchpad assembly 10 to the door 20, the extension 12 is passed through the key cylinder aperture 21, and elastomeric washers 16 and metallic washers 17 are sequentially fitted over the extension 12 and retained in place by a retaining clip 18 which engages the projecting flanges 14 of extension 12. The components of the installed assembly 10 are maintained under a state of high compression by means of the elastomeric layer 15 and the elastomeric washers 16. If desired, however, the elastomeric layer 15 can be bonded to the door or can be made of a material which is relatively tackfree but which will bond to the door after a period of time during which it is maintained in a compressed state against the door.

The bore 19 of the extension 12 is fitted with one part of a connector of conventional design into which a mating connector part 30 may be plugged. Polarizing means 31 are provided to ensure that the connector 30 is not installed upside-down.

The piezoelectric touchpad may be constructed using a piezoelectric coating such as is described in the Kompanek, U.S. Pat. No. 4,056,654, while the mechanical construction may be similar to that illustrated in the Kompanek, U.S. Pat. No. 4,190,785.

In the instant embodiment the piezoelectric coating is applied to a stainless steel can which has a sealed hollow tube within which a light blub is mounted. A conventional optic lens is edgelighted by the bulb and the numbers are all second surfaced so that white letters on a black background are illuminated by the light. The numbers indicate which areas of the lens are to be touched in the operation of the apparatus.

The touchpad assembly 10 has incorporated into it a lamp 32 which automatically is turned on for a brief period of time, in response to pressing any area of the touchpad. The lamp is shown in the detailed wiring diagram of FIG. 5A. The lamp 32 enables the touchpad to be operated at night or in dark areas.

The insulated conductors of the wiring harness 34 leading from the mating connector 30 need not be shielded, despite the fact that the piezoelectric output signals from the touchpad exist at a high impedance level, such as normally would require careful shielding. The shielding is dispensed with because the touchpad assembly 10 includes an electronic interface which effectively transforms the high impedance level of the piezoelectric signal to the low impedance level appropriate for conventional logic circuitry.

Figure 5A:
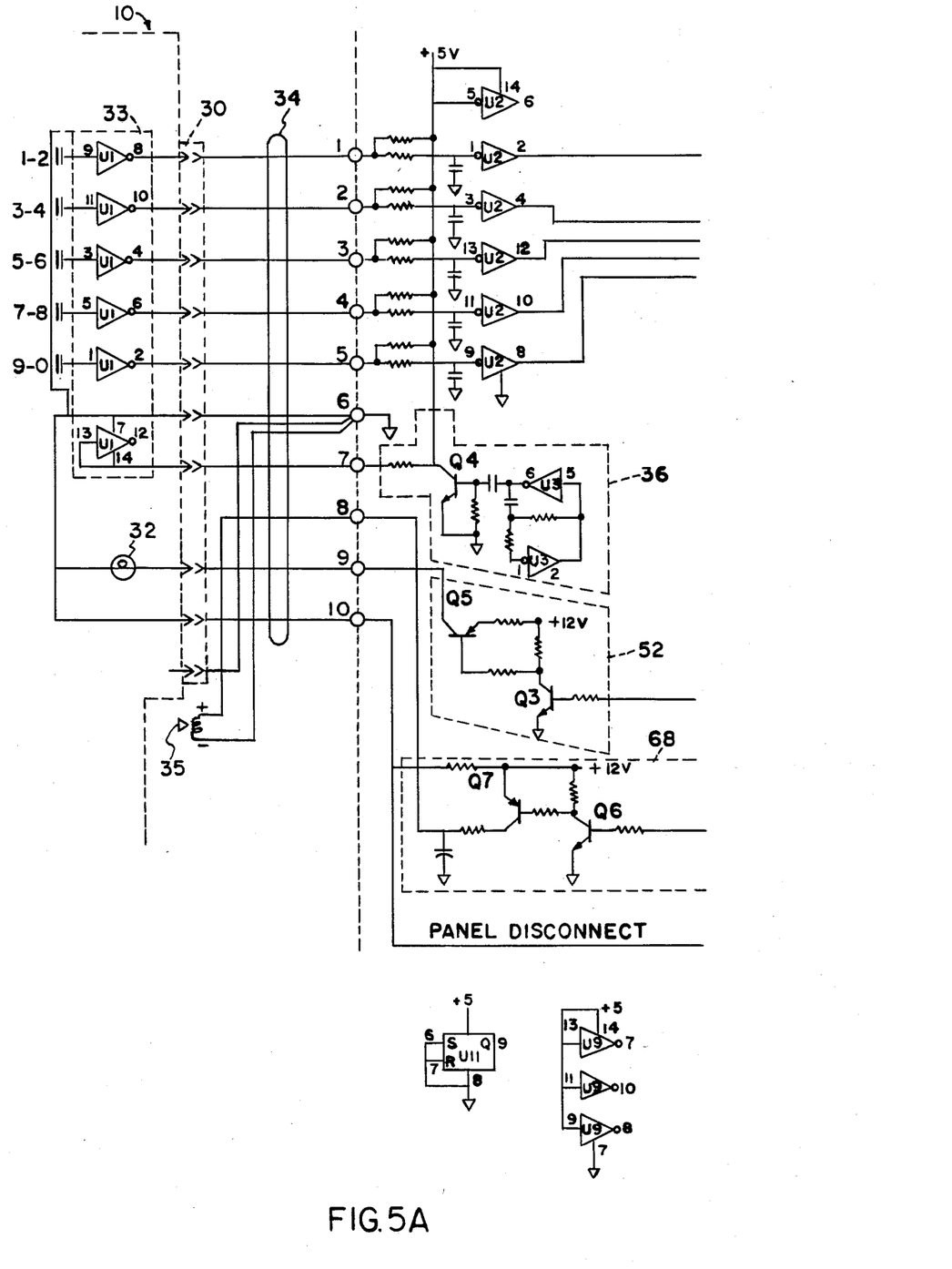
FIGS. 5A, 5B, and 5C, when placed side by side in alignment, disclose the circuit diagram of the keyless lock control system.

The electronic interface with the piezoelectric coated switch is accomplished by an integrated circuit having a hexbuffer transistor package 33 (FIG. 5A). This circuit is unique in that it provides a simulated resistive load across the piezoelectric switches. Hitherto it has been necessary to have an actual resistive load across the circuits to prevent self-charging of the piezoelectric devices due to their high impedance.

The sensitive load is simulated by driving the hexbuffer circuit at a high frequency (compared to the speed of finger actuations on the switch). Thus, by rapidly and repeatedly driving the piezoelectric switch to ground through a remotely located low value resistor, the resistance across the piezoelectric switch appears to be lowered. The hexbuffer device is an ideal choice for achieving this because the diodes which are in the hexbuffer for its own protection act as a grounding path for the charges generated by the piezoelectric touchpad. The ideal frequency for this appears to be about 125 hertz and the grounding time to be 1 microsecond.

The use of the electronic interface allows a practical switch package to be created for mounting in the lock cylinder aperture which is present on every car. The interface circuitry 33 is described more completely in Echols et al copending application Ser. No. 529,270, filed Sept. 6, 1983, now U.S. Pat. No. 4,490,639.

The touchpad assembly 10 also may include a small loudspeaker for giving a low volume audio signal to indicate, for example, operation of the touchpad in an improper sequence. Such a small loudspeaker could also be concealed in the door or elsewhere in the automobile, since it is actuated by and from equipment which is remote from the touchpad and can operate separately from the touchpad assembly 10. In order to simplify the disclosure, such a small loudspeaker 35 is not indicated in FIG. 4 and is shown in FIG. 5A as being separate from the touchpad assembly 10. The small loudspeaker 35 is not used as a burglar alarm, to give a loud or yaucous audible warning, but is used only to give a discreet, low intensity but audible signal, so as not to embarass a legitimate user who makes an inadvertent mistake in operating the touchpad.

Figure 4:
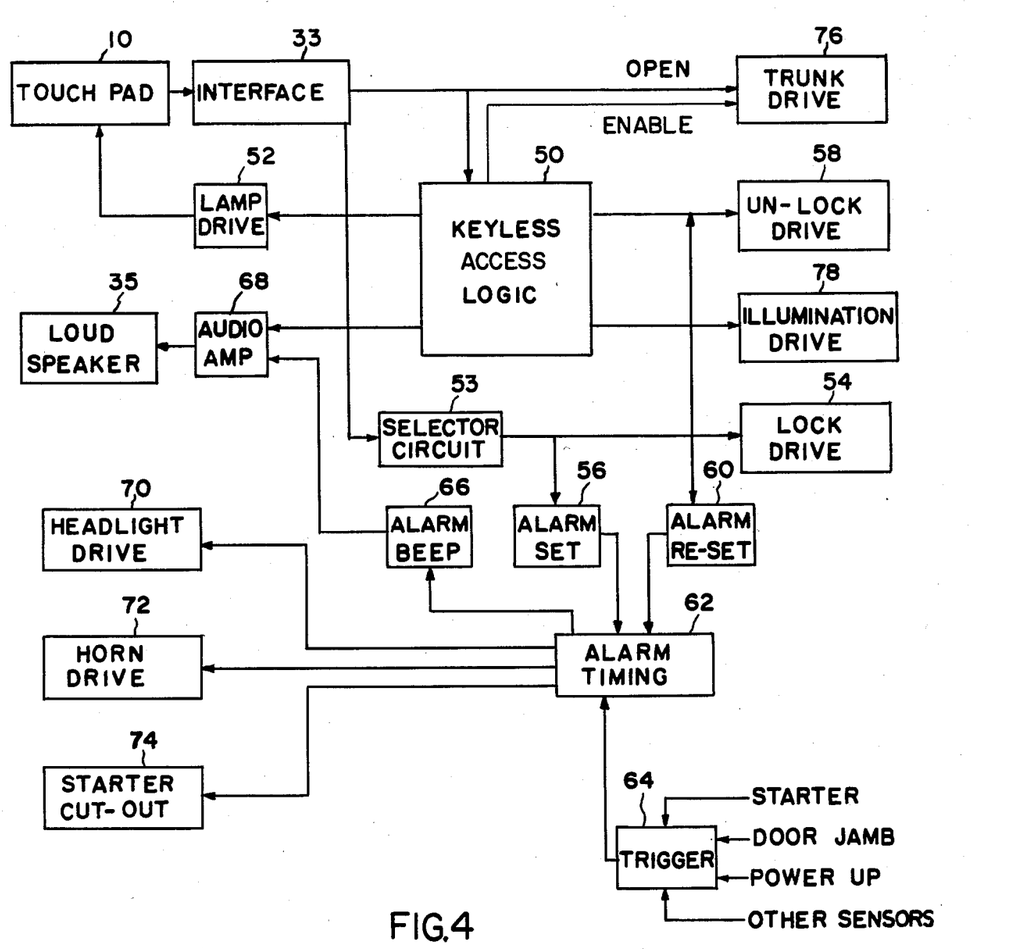
FIG. 4 is a block diagram showing the circuitry which is controlled by the touchpad.

The interrelationships of the various components of the system are illustrated in the block diagram of FIG. 4. The touchpad 10 is connected to the interface integrated circuit 33. Signals from the interface circuit 33 are sent to the logic circuit 50. When the logic circuit 50 receives a signal which indicates that the touchpad has been touched at any number, it sends a signal to the lamp drive 52 to activate the lamp 32 in the touchpad 10 for a few seconds.

The same signal from the touchpad 10 which is used by the logic circuit 50 to activate the lamp drive 52 is also used to activate the interior illumination for 25 seconds or so, or until the ignition switch is turned on.

The interface 33 can also be used to lock the door lock by pressing simultaneously a combination of two preselected touchpad numbers, such as "5" and "9", so that the doors can be locked from the outside of the automobile. Thus, the selector circuit 53 responds to the presence of simultaneous pressure on "5" and "9" to operate the lock drive 54 directly, without the necessity of having this function programmed into the logic circuit 50.

At the same time the door lock is set to its locked position, a signal is sent from the selector circuit 53 to an alarm set 56. If a valid code thereafter is tapped into the touchpad 10, the logic circuit 50 will send a signal to a door unlock drive 58 and to an alarm reset 60.

A five digit access master code is set by the user in the manner disclosed in Ligman et al U.S. Pat. No. 4,206,491. There is no restriction on repeat numbers. This code will not erase with loss of power. Use of this master code followed by pressing a further selected number, such as a "1" allows the next five digits to be entered as a secondary code, all as is explained in the Ligman et al patent. There are over 3,100 combinations of either primary or secondary codes available. Entering the secondary code permits the system to perform all functions expect reprogramming a secondary code. The secondary code is erased with loss of power. In using the primary code, tapping a 5 digit correct code followed by a selected digit, such as "3", will momentarily energize a trunk release relay. Whenever the touchpad 10 has been operated to program a new secondary code, however, the trunk cannot be opened until a valid code has been reentered.

Tapping sixteen touchpad keys in any sequence that does not include a valid code will cause the small loudspeaker 35 to sound and the system to lock up for about 25 seconds. Such procedure may also trigger the alarm system after it has been set. The first warning of the triggering of the alarm is an audio signal on the speaker 35. This is followed by the activation of the vehicle's horn and the flashing of its lights if the alarm system has been set. Then after the lock up timing is completed the user can stop the alarm at any time by entering the proper code into the touchpad 10. The engine starter solenoid is disabled during the time the alarm is activated.

The alarm relay attached to the horn and the headlights will cycle on and off at approximately 1 HZ for a predetermined time up to four minutes. Then the alarm automatically is reset. Should an alarm indicator signal still be present, the alarm will be reactivated. The alarm set 56 is armed from the touchpad, as previously described, or by interruption of the 12-volt power for 10 seconds or longer. Once armed the alarm can only be disarmed by entering a valid code at the touchpad. Once the alarm set is armed, the alarm can be triggered by entering sixteen digits of incorrect code at the touchpad, tampering with the touchpad, energizing the starter motor, or by signals from additional sensors.

Figure 5B:
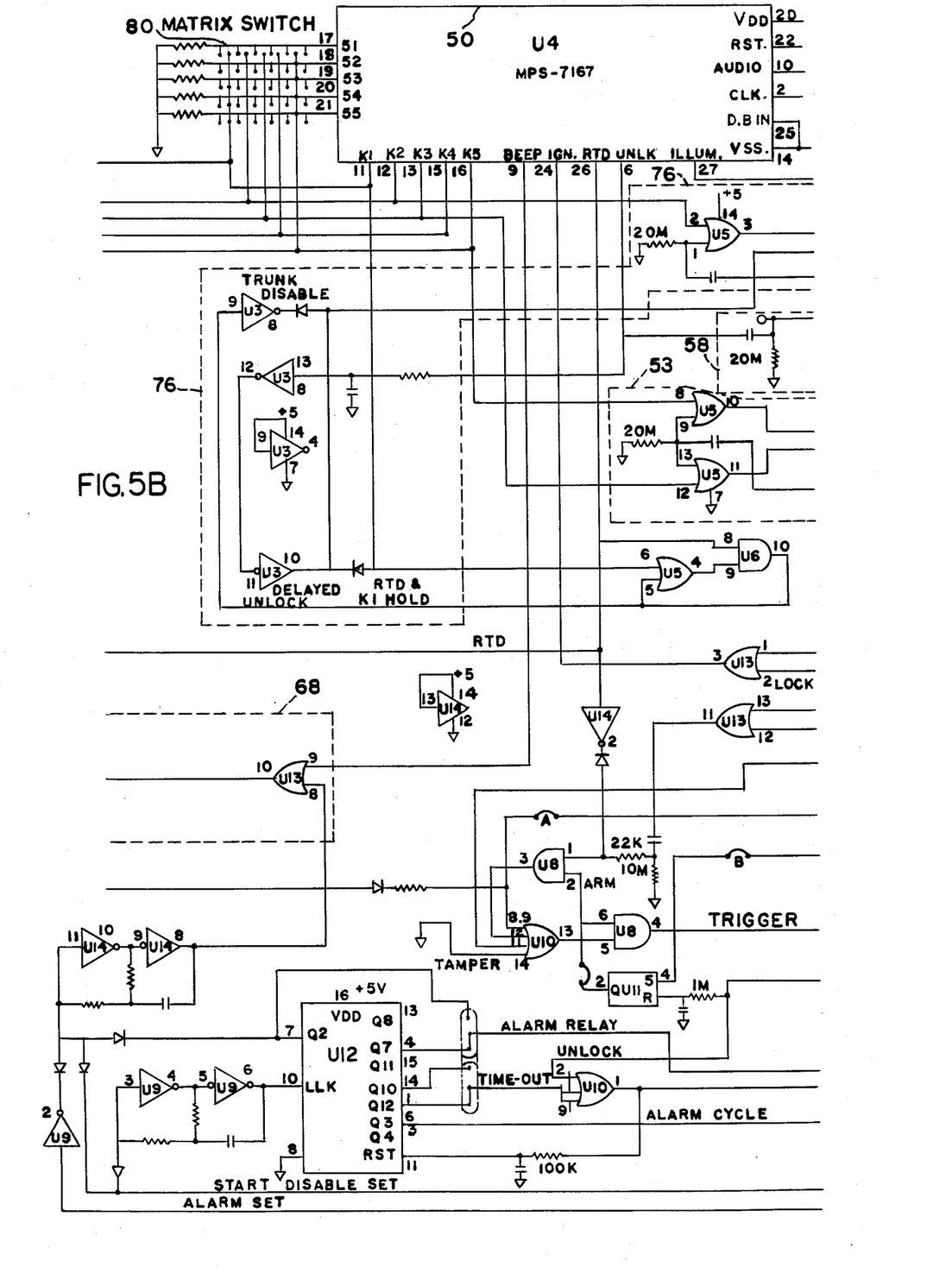

For example, if somehow the touchpad assembly 10 should be removed from the door 20, the ground which was provided to the touchpad assembly 10 at the circuit board terminal 6 of FIG. 5A also is removed at circuit board terminal No. 10, permitting terminal No. 10 to go high at +12 volts and thereby signalling "Panel Disconnect" to the "Tamper" OR gate U10 of FIG. 5B.

Referring again to FIG. 4, the alarm timing circuit 62 received signals from the alarm set 56 and the alarm reset 60. If the alarm is set and the alarm trigger receives a signal indicating removal of the touchpad 10, starting the motor, or any of the other conditions described above, the trigger 64 sends a signal to the alarm timing circuit 62. The alarm timing circuit 62 then sends a signal to the warning circuit 66. The warning curcuit 66 is a multivibrator which generates a tone that is passed to the audio-amplifier 68 and then to the speaker 35. If a correct code is not entered during the 10-second warning at the speaker 35, the alarm timing circuit 62 will send a signal to the headlight drive circuit 70 to flash the headlights, to the horn drive 72 to blow the horn, and to the starter cut-out 74 to disable the starter.

In the event sixteen digits are entered on the touchpad in an incorrect sequence, the circuit 66 will generate a tone. No correct code may be entered until the U4 lock out is completed at which time a correct code may be entered to activate the alarm reset 60 and stop flashing of the lights, blowing of the horn, and enabling the starter circuit.

The trunk drive circuit 76 releases the trunk lock when it receives two signals, the first being an enable signal from the logic circuit 50 signifying that a correct code has been tapped into the touchpad 10, and the second being the digit 3 directly from the interface 33 signifying that the user wants access to the trunk. Upon entry of a correct code the logic circuit 50 sends a signal to the illumination drive 78 which lights the interior light for 25 seconds. The touchpad light is lit with the initial push on the touchpad.

Figure 5C:
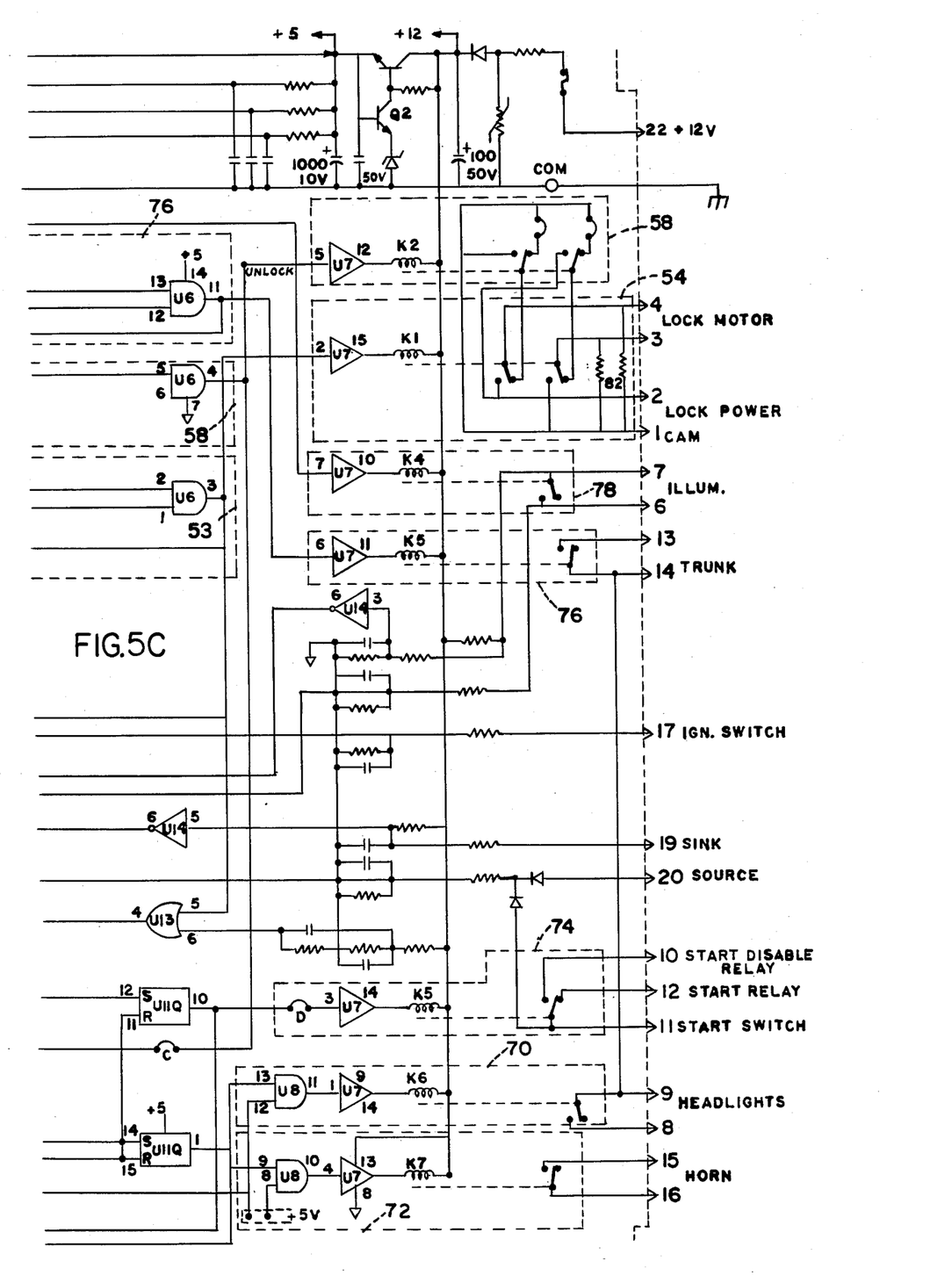
Figure 6:
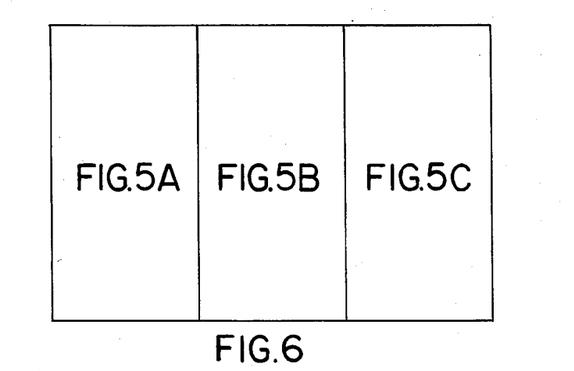
FIG. 6 is a showing how FIGS. 5A, 5B, and 5C should be placed side by side to form the complete circuit diagram.

The system described above can be implemented in many different embodiments by skilled practioners. Various means can be constructed by using combinations of hardware, firmware, and software. One embodiment, by way of illustration, is shown in FIGS. 5A, 5B, and 5C.

At the heart of this embodiment is the unit U4, a conventional integrated circuit MPS-7167 produced by a number of manufacturers. This integrated circuit, together with its supporting circuits, fulfills the function of the logic circuit 50. It recognizes a valid primary code as established by the code matrix jumpers 80, stores the secondary code in its memory, and provides output signals to the lamp drive 52, the audio amplifier 68, the unlock drive 58, the trunk drive 76, the illumination drive 78, and the alarm reset 60. Touchpad sinking (negative going) pulses at terminals 1 through 5 are filtered and inverted by inverting amplifiers U2, to provide positive-going pulses to inputs K1 to K5 (pins 11, 12, 13, 15, and 16) of the unit U4.

The integrated circuits U1, collectively called the interface 33, are enclosed in the touchpad assembly 10, affixed to the outside of a door panel, and are powered by a pulsing bias as explained in the aforementioned copending application. The pulsing bias source 36 includes two sections of U3 which constitute a blocking oscillator, which feeds Q4 with a pulsing signal so that Q4 will momentarily ground the resistor which feeds +5 V to the touchpad interface. The devices Q3 and Q5 amplify the panel lamp signal from pin 26 of U4, so that Q3 and Q5 are collectively the lamp drive 52.

The devices Q6 and Q7 amplify the audio beep signals from pin 9 of U4 or, through U3, the alarm warning signal generated by two sections of U14. The circuits of Q6, Q7 and U13 are collectively the audio amplifier 68. The two sections of U14 are collectively the alarm signal 66. This oscillator is enabled when all three diodes at pin 11 of U14 are reversed biased. This condition occurs when the alarm is set and in the triggered warning signal time (U11, Pin 1), and the alarm has been triggered (U11, Pin 10) and the clock is in a high portion of its cycle (U12, Pin 7). This last item gives the warning tone a ½ second on/off cycle.

When a valid code is entered via the touchpad 10, the unlock signal from U4 pin 6 goes high for 5 seconds.

This is converted into a ¾ second pulse by the resistor and capacitor at U6 pin 5, 6 to drive the unlock relay through driver U7. This signal also resets the three alarm sections of U11. During the 5-second unlock period, the trunk circuitry (U5 pins 1, 2, 3 and U6 Pins 11, 12, 13) is enabled so that a press on the touchpad at digit 3 will energize the trunk relay K1 through driver U7. However, a slight delay is built in so that if touchpad "3" is the last digit of the code, it does not overlap and accidently drive the trunk circuitry. This delay is accomplished by the resistor and capacitor between U4 pin 6 and U3 pin 13.

Additionally, if touchpad "1" is pressed after a valid code in order to program a new secondary code, it is undesirable to have the trunk open if touchpad digit 3 is pressed as part of the new code. This is avoided by having U5 pins 4, 5, 6 and U6 pins 8, 9, 10 hold the trunk circuitry disabled from the time touchpad digit 1 is pressed until a new code is successfully programmed.

The device U5 has pins 8, 9, 10, 11, 12, 13 and the device U6 has pins 1, 2, 3 to generate the LOCK signal when touchpad 10 digits 5 and 9 are pressed simultaneously. These last devices are collectively the lock drive 54. The signal from U6 pin 3 goes not only to driver U7 pin 7 but also to U13 pins 2 and 5 to turn off the interior lamp (pin 24 of U4 goes high with pin 3 of U13, and pin 27 of U4 then outputs a signal to turn off the lamp) and arm the alarm section by setting flip-flop U11 pin 4. Initial power applications also set the alarm, and a 12 volt signal at terminal 17 (ignition switch) also turns off the interior lamp.

One section of U10 accepts any one of three signals to trigger the alarm, if set. When triggered, U11 pin 10 goes high to start the clock and counter U9 and U12 to run to first put out a warning signal then set flip-flop U11 pin 14 to energize the headlight and horn relays and turn off the warning signal. At the end of one or four minutes (selected by jumper at U12 pins 1, 14) the alarm is stopped but remains set by resetting of U11 pins 11 and 15. If a valid code is entered, the alarm is stopped as explained above.

The horn relay may be selected to cycle on/off by jumper tying U8 pin 13 to the one second clock U12 pin 6 or to sound continuously by jumping the pin 13 to +5 volts.

The following signals will trigger the alarm, if set: a courtesy lamp switch (not shown) located in the door jamb closing across terminals 6 and 7 of the circuit board (shown at the right center edge of FIG. 5C); a ground at terminal 19 or a positive voltage at terminal 18 by other alarm inputs; and positive starter switch at terminal 11. Since the illumination relay K2 closes when any touchpad is pressed, when entering a code the alarm would start its activation cycle as if a door had been opened while the alarm is set. To keep this from happening, buffer U14 pins 1, 2 alarm when U4 pin 26 is high.

The general locations of the lock drive 54, the unlock drive 58, and the trunk drive 76 are each shown in two parts in FIG. 5C because of the complexity of the schematic diagram. The alarm set 56, the alarm reset 60, the alarm timing circuit 62, and the trigger 64 are intermixed near the bottom of FIGS. 5B and 5C, and are therefore not enclosed in legended boxes.

In other embodiments the alarm can be set, the door locked, and the trunk unlocked by other combinations of codes. Specialized touch areas can be added to the touchpad 10 to execute these functions rather than using special digits.

This disclosure is representative of a presently preferred embodiment of the invention, but is intended to be illustrative rather than definitive thereof. The invention is defined in the claims.

What is claimed is:

1. A piezoelectric touchpad unitary assembly adapted for mounting on a vehicle door, said touchpad assembly comprising a housing having a rear face adapted to bear against said vehicle on the outside thereof, said housing also having an accessible surface provided with plural indicia symbols indicating different areas of the surface which are to be tapped by a user to input commands into the touchpad; a plurality of piezoelectric sensors mounted individually adjacent the said indicia symbols between the latter and said rear face and adapted to emit individual signals at a high impedance level in response to individual tapping of indicia symbols by a user; impedance level conversion means individual to each sensor and located immediately adjacent thereto for converting each of said high impedance level signals to a corresponding low impedance level signal adapted for individual and separate transmission to a remote location; and individual conductor means for connecting the low impedance level signal from each of said impedance level conversion means to a corresponding individual terminal of a multiterminal connector mounted adjacent said rear face, an unshielded multiconductor cable extending from said multiterminal connector to said remote location, said multiconductor cable having connector means for mating with said multiterminal connector and thereby electrically connecting said individual terminals with respective conductors of said multiconductor cable.

2. The apparatus of claim 1 including means overlying said indicia symbols to protect them against wear by use or by environment.

3. The apparatus of claim 1 including elastomeric means between said rear face and the outside of said vehicle door to provide a seal between said touchpad assembly and said door.

4. The apparatus of claim 1 wherein said vehicle door has an aperture therein, and wherein said touchpad assembly has an extension projecting from said rear face, and including means for reacting between said extension and said vehicle door to seat the said rear face firmly against the outside of said door.

5. The apparatus of claim 4 wherein said multiterminal connector is mounted on said extension.

6. The apparatus of claim 4 wherein said extension is hollow and said multiterminal connector is mounted within said extension.

7. The apparatus of claim 1 including digital code storing means at said remote location which stores a main code when power is lost; means for comparing said stored main code with the code of the low impedance level signal outputs of said plurality of piezoelectric sensors to determine whether or not there is a match therebetween; and means responsive to the result of the determination for correspondingly controlling a function.

8. The apparatus of claim 7 including locking means for said door; and means to lock and unlock said locking means, said means to lock and unlock being under the control of said means responsive to the result of the determination.

9. The apparatus of claim 7 wherein said means for comparing is capable of receiving an alternate code input at said touchpad assembly, storing said alternate code, and comparing another code input at said piezoelectric touchpad with said stored alternate code.

10. The apparatus of claim 1 including means for giving an alarm; means for enabling said means for giving an alarm; and means for triggering said means for giving an alarm in response to the opening of said door.

11. The apparatus of claim 10 wherein said vehicle has an engine and starting means for starting said engine, and means for triggering said means for giving an alarm, after being enabled, in response to operation of said starting means.

12. The apparatus of claim 10 including means for triggering said means for giving an alarm in response to removal of said touchpad assembly from said vehicle.

13. The apparatus of claim 10 including means for triggering said means for giving an alarm, after enablement thereof, in response to the entry of an excessive number of input commands at the said touchpad without a correct main or alternate code.

14. The apparatus of claim 13 wherein the excessive number of input commands is more than fifteen.

15. The apparatus of claim 10 including means for giving a low-level beep alarm; means for turning on said last named means in response to entry of an incorrect code into the touchpad, if the means for giving an alarm has been enabled; means for continuing said low-level beep alarm for a predetermined period; and means for triggering said means for giving an alarm after said predetermined period has expired.

16. The apparatus of claim 15 including means for disabling said means for giving an alarm in response to keying into said touchpad a correct main code or correct alternate code.

17. In an enclosure having an access opening and a closure movable between open and closed positions and power locking means for selectively locking and unlocking said closure in its closed position, said locking means being coupled electronically to a control unit operable to generate a plurality of discrete electrical pulses, and said locking and unlocking means comprising selective circuitry means responsive to the generation of a selected number of said pulses in a predetermined sequence to unlock and permit movement of said closure to its open position, normally inactive alarm means, and electrical means coupling said alarm means to said control unit and said selective circuitry means and operable to effect actuation of said alarm means in the event said control unit generates pulses in a sequence other than said predetermined sequence, the improvement comprising:

further circuit means, responsive to the generation of a concurrent number of chosen discrete electrical pulses by said control unit, which number is more than one but less than said plurality of discrete electrical pulses, for directly actuating said locking and unlocking means in response to said concurrent number of chosen discrete electrical pulses, to selectively lock said movable closure in its locked position.

18. The construction of claim 17 including means in circuit with said electrical means operable to disable operation of said alarm means in response to the generation of pulses in said predetermined sequence.

19. The construction of claim 17 wherein said coupling means includes arming means for initiating operation of said alarm means; warning means; and means interconnecting said arming means and said warning means for operating the latter in advance of actuation of said alarm means.

20. The construction of claim 17 wherein said coupling means includes cycling means for cyclically interrupting and restarting the operation of said alarm means.

21. The construction of claim 17 wherein said enclosure comprises a motor vehicle and wherein said closure comprises a door selectively permitting and preventing access to said vehicle.

22. The construction of claim 21 wherein said vehicle includes an electrically operable engine starter for cranking an engine, and including means in circuit with said electrical means for disabling operation of said starter in response to operation of said alarm means.

* * * * *